Aug. 12, 1969  J. W. CURLEE  3,460,828
RANDOM MOTION RECREATION VEHICLE
Filed Aug. 18, 1965  3 Sheets-Sheet 1
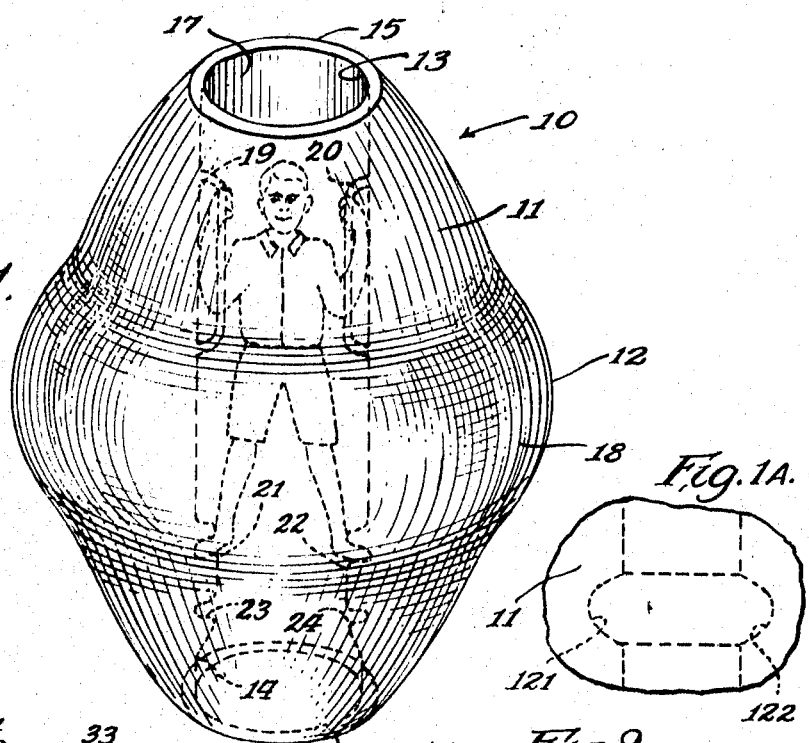
Fig.1.
Fig.1A.
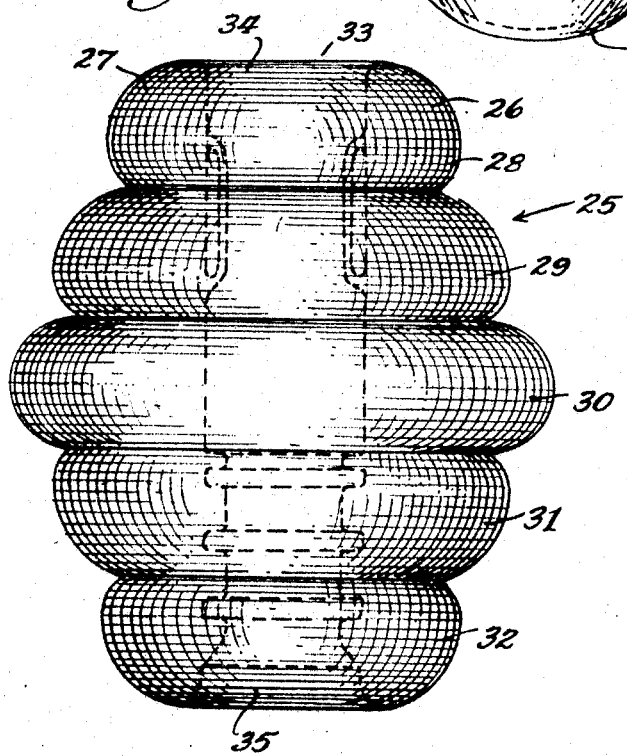
Fig.2.
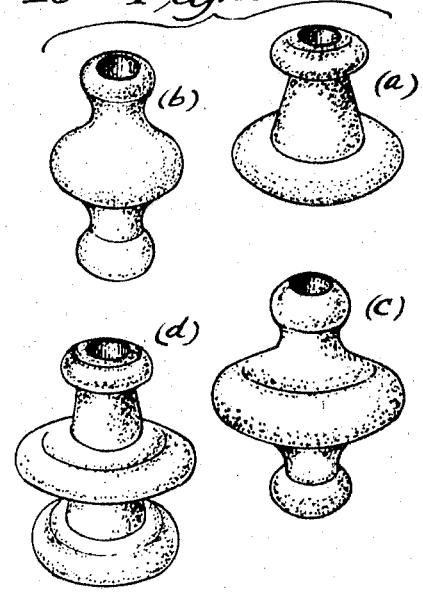
Fig.9.
Inventor
John W. Curlee
By Petheridge, O'Neill & Aubel
Attys.

Inventor
John W. Curlee
By Petherbridge, O'Neill and Aubel
Attys.

Inventor
John W. Curlee
By Petherbridge, O'Neill
and Aubel.
Attys.

United States Patent Office 3,460,828
Patented Aug. 12, 1969

3,460,828
RANDOM MOTION RECREATION VEHICLE
John W. Curlee, 17910 S. Sayre, Tinley Park, Ill. 60477
Filed Aug. 18, 1965, Ser. No. 480,547
Int. Cl. A63g 1/12, 31/00; B63c 9/18
U.S. Cl. 272—33                            6 Claims

ABSTRACT OF THE DISCLOSURE

A recreational apparatus is disclosed having a resilient body including a cavity for receiving a human passenger (child) therein, said body having a major and a minor axis and its outer surface including protruding projections to permit a random bouncing motion to be imparted to the apparatus.

---

This invention relates to an apparatus for use for recreational and exercising purposes; and, more particularly, to an apparatus arranged to carry a human, particularly a child, and formed in a shape permitting a tumbling, rocking or flopping action to be obtained when the apparatus is actuated.

A principal object of the present invention is to provide an apparatus made of a durable resilient material and in a manner such that it will rock, bounce, tumble or flop in a random manner when actuated, either by a child carried by the apparatus, or by external means.

The present invention is designed to provide a recreational device for humans, particularly children, and one which is relatively cheap to construct, safe to operate, and easy to control. It will provide an apparatus which is shaped to provide substantial vigorous rocking, tumbling or bouncing movement in a relatively confined area and which cannot be readily rolled out of a given location and into a street or other dangerous area.

The apparatus can assume a variety of shapes in producing the desired rocking, tumbling or bouncing motion. One embodiment has a generally ellipsoidal configuration or football shape having its longitudinal axis positioned in vertical relationship to its supporting surface in its normal inoperative position. An entry and exit portal and an operating chamber are provided in the apparatus. The operator of the apparatus boards it and by moving his weight around within the operating chamber causes the apparatus to tumble or rock in a haphazard manner in response to this movement or to that exerted by another party outside of the apparatus.

Due to the non-spherical nature of the shape of the apparatus, the substantial and continuous horizontal movement of the apparatus is impeded. This is a significant safety feature provided by the subject apparatus in preventing the initiation of a rolling motion which cannot be controlled or stopped by the operator. The grave consequences of the uncontrolled rolling of an apparatus such as this in close proximity to automobile traffic are easily understandable.

The bottom portion of the apparatus can, in certain instances, be weighted. This weight will serve to counterbalance the apparatus in a manner such that the rocking or tipping of the unit from its normal at rest axis will be immediately corrected and the apparatus made to assume its normal vertical position.

In some instances it is desirable to utilize a surface reinforcement in the chamber and in other instances it is desirable to utilize a cylinder equipped with position orienting means in the operating chamber. Under such circumstances, the resilient material forming the exposed portion of the apparatus would be molded about the cylinder. The cylinder would ordinarily be equipped with yieldable gripping fixtures with which the operator could comfortably orient himself within the apparatus and maintain his position without danger of injury while rocking and tumbling.

It has been determined that the apparatus can be fabricated from resilient inflatable materials or from any of the variety of widely available moldable resilient foam materials. The apparatus can be made in a variety of shapes including, but not limited to, a generally ellipsoidal shape supportable upon either its horizontal or vertical axis, a truncated cone supportable upon any of its axes, a spheroidal shape formed with spaced projections, a prism shape, a paraboloidal shape and an irregular shape.

The foregoing and other objects, features and advantages of the invention will become apparent from the following more particular description of preferred embodiments of the invention, as illustrated in the accompanying drawings wherein:

FIG. 1 is a perspective view of a generally ellipsoidal embodiment of an apparatus made in accordance with the present invention and containing a human operator;

FIG. 1a is a fragmetary view showing a modification to the embodiment of FIG. 1;

FIG. 2 is a side elevation of a second generally ellipsoidal embodiment of the apparatus showing the operating chamber in phantom;

FIGS. 9a, 9b, 9c and 9d show the outline of additional configurations of an apparatus according to the invention.

Figure 3:
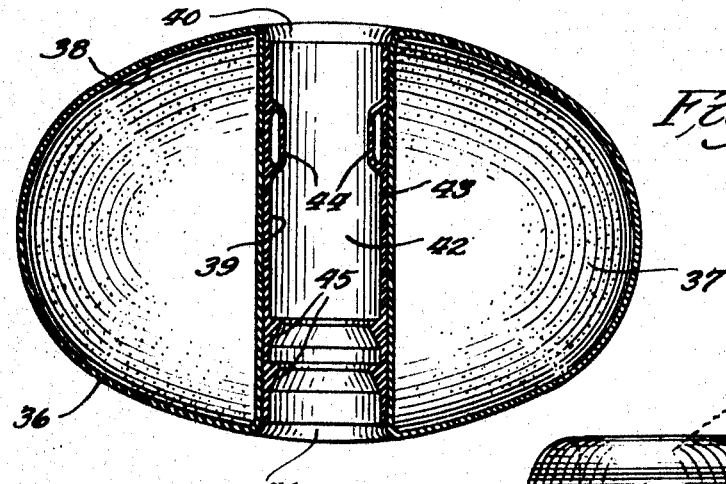
FIG. 3 is a transverse sectional view of an ellipsoidal variation of the configuration of an inflatable embodiment of the apparatus of the invention illustrating an operator supporting cylinder.

Referring to FIG. 1, the apparatus 10 according to the invention consists of a body 11 which can be formed from either a resilient foam material, such as the widely available foam rubbers or plastic foams, or any of the durable inflatable plastic and rubber sheet materials.

The body 11, in this instance fabricated from inflatable sheet material, includes an outer shell or cover 12 and an inner shell or cover 13 which are joined together for inflation to produce a generally ellipsoidal or football shape. Air may be pumped through a valve of any suitable known type, as indicated by the valve stem 14, to inflate the body 11 to its predetermined shape.

The outer shell 12 is arranged to have its two open ends 15 and 16 terminate in truncated sections to provide access to a cavity or passageway 17, as will be described. In some instances, however, one or the other of the openings into the cavity can be wholly eliminated with the remaining opening serving as both an entry and exit portal.

The outer shell 12 includes an expanded or protruding center portion 18 around the circumference, formed along the minor axis of body 11. The protruding portion 18 provides a two-fold function. First, the protruding portion 18 enables the apparatus 10 to provide a more pronounced random tumbling action; and, second, the protruding center section 18 will cause the apparatus to tend to revolve about its enlarged center portion 18 (such as a top) and hence to maintain a smaller radius of activity which makes the apparatus safer to operate.

The inner shell 13 and the truncated sections 15 and 16 form a cavity or passageway 17 along the longitudinal axis of the body 11. The cavity 17 is of a sufficiently large diameter and of sufficient length to permit ingress and egress for a human passenger through either end of the body 11 and to accommodate the passenger in a standing position, as indicated in FIG. 1. For descriptive purposes, the embodiments of the invention set forth shall be described with reference to a child passenger although apparatus capable of supporting adults are considered to be part of the invention.

Figure 8:
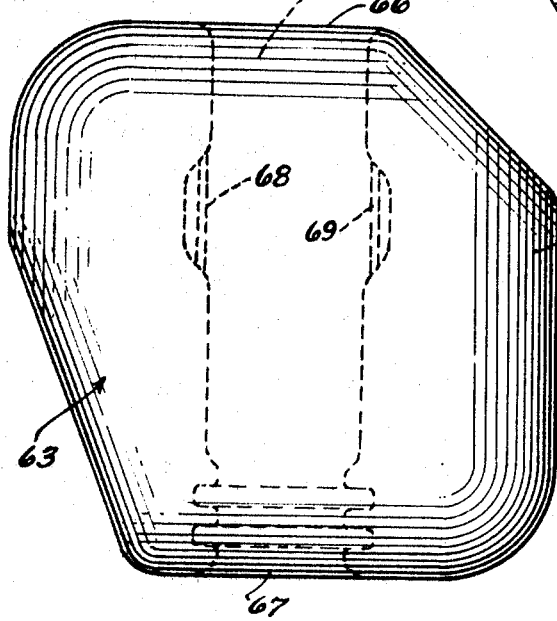
FIG. 8 is a side-elevation of an additional embodiment of the invention having a generally irregular configuration.

Two handgrips 19 and 20, which may be formed of rubber directly molded to the inner shell 13 or which may be more pliable grips such as of canvas, are affixed to the inner shell to enable a child to grasp the straps to hold himself during the tumbling and bouncing action of the apparatus. In some instances it may be desirable to recess the handgrips in a manner eliminating projections from the passenger cavity as is shown in FIG. 8. Also, by varying the position of a child's body with relation to the handgrips 19 and 20, a child's body, arms and neck can be exercised in varying positions while still enjoying the recreational features of the apparatus.

Recesses indicated as 21 and 22 are formed in the inner shell 13 to provide a footing or step for the child's feet. Additional recesses 23 and 24 are included to accommodate children of different heights. Further, as shown in FIG. 1a, recesses indicated as 121 and 122 may be provided into which the child can insert his hands or fists to brace himself. The recesses 121 and 122 may extend entirely around the inner shell 13 as they may comprise grooves positioned in spaced relation around the inner shell 13. Recesses 121 and 122 may thus be substituted for the grips 19 and 20.

It has proved to be desirable, both for purposes of enjoyment as well as for safety, that the body 11 be of a relatively transparent maetrial to permit the child within the body 11 to be seen and to permit him to be able to see the environment in which he is tumbling.

A second embodiment of the invention, as shown in FIG. 2, may be formed of a plurality of inflatable members such as tire inner tubes of different sizes which are bonded or connected to one another such as by an adhesive or by straps, not shown. Any of the embodiments of the invention may utilize a molded resilient foam in place of inflatable members. The external configuration of the apparatus 25 shown in FIG. 2 is generally similar to the body 11 of FIG. 1; that is, it includes a generally ellipsoidal body 26 having an external surface or outer shell 27.

In FIG. 2, the body 26 is formed from a number of doughnut-shaped segments 28, 29, 30, 31 and 32. Segment 30 serves as the protruding center section formed on a minor axis of body 26. The doughnut-shaped members 28–32 are of varying size and are mounted adjacent one another with the members 28 and 32, which have the smaller diameters, forming either end of the body 26, and with the largest diameter segment 30 positioned in the center of the body 26 to form the protruding portion similar to that shown in FIG. 1.

The center cavity or passageway 33 of the embodiment of FIG. 2 opens at ends 34 and 35 and is similar to that of FIG. 1.

To operate the apparatus of FIGURES 1 and 2, the body is first positioned to have the end openings 15, 16, 34 and 35 of cavities 17 and 33 in a horizontal position. A child may then crawl through into the cavity and assume the position substantially as shown in FIG. 1. The child may then move his legs against the recesses 21 and 22 and his arms against the straps 19 and 20 in a rocking and swinging motion. Because of the resiliency of the bodies 11 and 26, and because of the protruding center sections 18 and 30 and the general overall shape of the bodies, a rocking, bouncing, tumbling action will readily be obtained. The amount or degree of bouncing and tumbling action will depend on the degree of vigorous movement of the child within a body cavity.

Another way of initially activating the apparatus is to have a person outside of it initiate the bouncing action. A child within the apparatus may then continuously move to keep it in motion. As mentioned above, the more vigorous the movement of the child within the apparatus, the more vigorous will be the bouncing, tumbling action.

The embodiment of the apparatus 36 of the invention shown in FIG. 3 is ellipsoidal in appearance and is designed to be positioned with its major axis in generally parallel relation to the ground or other supporting surface when in an at rest condition. The body 37 of the apparatus 36 is formed from an inflatable member having an outer shell 38 and an inner shell 39. The body is provided with openings 40 and 41 spaced on the minor axis of the apparatus. The openings establish communication with a cavity or passageway 42 and provide entry and exit ports therefor.

The cavity 42 of the apparatus 36 is provided with a reinforcing cylinder 43. The outermost surface of cylinder 43 is positioned in substantially continuous surface-to-surface contact with the inner shell 39 of the body. Cylinder 43 serves to simplify the production and maintenance of a child supporting cavity within the confines of the inflated body 37. The inner shell 39 is protected from damage from with the cavity by cylinder 43. In the event that the body 37 should become severely damaged in a manner such that the inflatable member should explode, cylinder 43 provides an added safety feature by acting as a shield to protect the occupant or passenger from the consequences of such an occurrence. And, the cylinder 43 serves as a means for anchoring position orienting handgrips 44 and toe holds 45 within the confines of cavity 42.

Apparatus 36 of FIG. 3 operates in a manner similar to that of the apparatus of FIGS. 1 and 2. By elevating one of the ends of the body, a child may enter cavity 42 and arrange himself with respect to the handgrips 44 and toe holds 45 of cylinder 43 and commence rocking and tumbling. Of course, the action of the apparatus can be initiated from outside the body.

Figure 4:
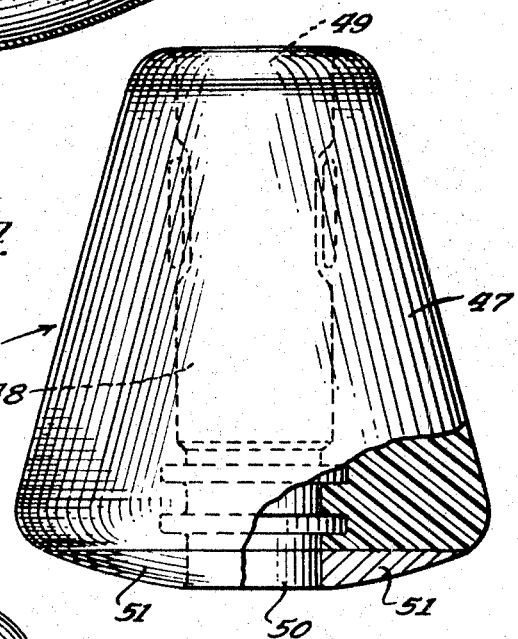
FIG. 4 is a side-elevation partially in section of another embodiment of the invention defining a generally truncated-cone configuration provided with a weighted base portion.

FIG. 4 illustrates an embodiment of the invention wherein the apparatus 46 has the general appearance of a truncated cone or of a man carrying space vehicle. The body 47 of this apparatus, in this instance fabricated from a resilient plastic foam, is provided with a cavity 48 which extends along its longitudinal axis. The cavity 48 is provided with openings 49 and 50 which serve as entry and exit ports.

The base portion of body 47 is provided with an annular weight 51 which borders opening 50. The annular weight 51 may be bonded to the body or connected thereto by mechanical means such as straps, snaps, etc. (not shown). Weight 51 serves as a counterbalance. When the occupant of the apparatus 46 deflects it from its normal at rest position, the weight 51 secured to the base of the body 47 acts to automatically return the apparatus to its normal at rest position.

This weighted embodiment, therefore, serves to produce a recreational exercise apparatus which is almost impossible to turn upside down. For those individuals who prefer an apparatus which will produce a more subdued performance than that which the embodiments of FIGS. 1, 2 and 3 are capable of, the apparatus 46 will be eminently preferable. Where desired, any of the embodiments of the invention may employ weights to produce an automatic righting action.

The apparatus shown in FIG. 4 can be produced in a manner such that it is normally supported upon the smallest end of the truncated cone configuration. In other words, the longitudinal axis of the body can be rotated 180° whereby the enlarged base becomes the uppermost portion of the apparatus. Further, the apparatus 46 can be produced for use with or without a weight 51 or weights can be provided with the apparatus and employed at the option of the user.

Figure 5:
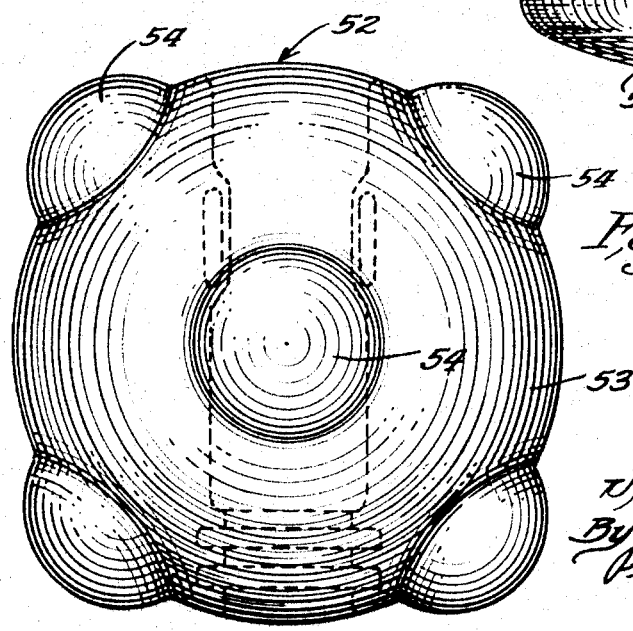
FIG. 5 is a side-elevation of an embodiment of the invention formed with a generally spheroidal shape having spaced projections protruding from it.

An apparatus 52 of the invention, shown in FIG. 5, is formed with a generally spherical body 53. The body is provided with a plurality of spaced projections 54 protruding from the outer periphery of the spherical body. The spaced projections serve to break up the spherical surface of body 53 to prevent it from rolling in an uncontrollable manner when actuated by an occupant or by another when the cavity (shown in phantom) is occupied.

Figure 6:
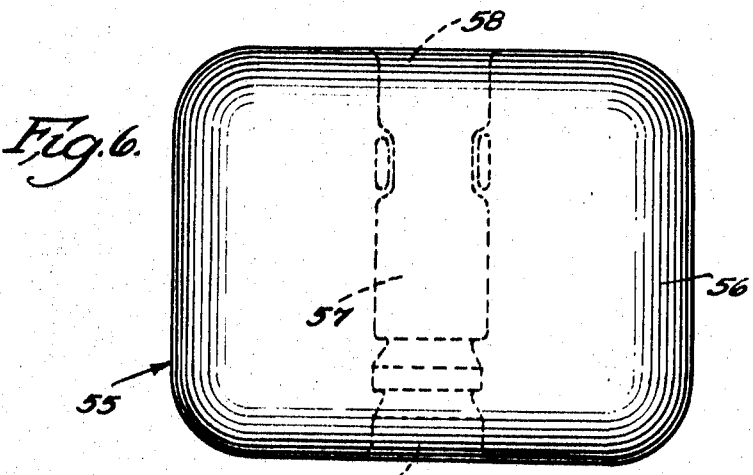
FIG. 6 is a side-elevation of an embodiment of the invention having a prism shape.

FIG. 6 illustrates a generally rectangular apparatus 55 which can be modified to provide any prism configuration. The body 56 of rectangular apparatus 55 is provided with a centrally located cavity 57 extending generally vertically from the base to the upper surface thereof along a minor axis of the body. Entry and exit ports 58 and 59 at the extremities of cavity 57 provide a means for a child to enter and leave the actuating cavity.

The embodiment of FIG. 6, like those of the previous figures, can be bounced, rocked or tumbled from within the apparatus or by external means.

Figure 7:
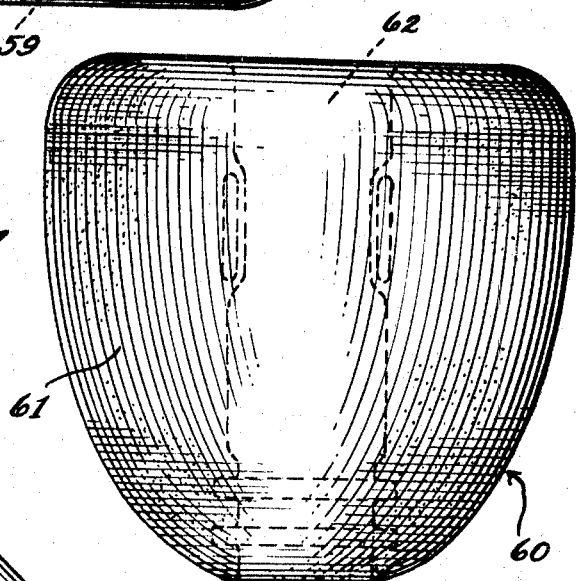
FIG. 7 is a side-elevation of an embodiment of the invention having a generally paraboloidal shape.

A paraboloid apparatus 60 is shown in FIG. 7. In this embodiment of the invention, the body 61 is designed to be readily deflected from its normal upright position. However, substantial horizontal displacement of the body is prevented by the cupped lower surface of the paraboloid. The child supporting cavity 62 is shown by dotted lines to extend along a major axis of the body 61. Entry, exit and operation of this apparatus conforms to that of the previous embodiments.

FIG. 8 illustrates an apparatus 63 of the invention which is characterized by a generally irregular configuration. The body 64 of the apparatus has a major and a minor axis which are unequal in length. The child supporting cavity 65 is shown located along the major axis although this could be changed to the minor axis where desired. Upon entry into the cavity through either of the open ends 66 and 67, apparatus 63 is operated similarly to the prior embodiments. In this embodiment, however, handgrips 68 and 69 are shown to be recessed in the child supporting cavity 65. This apparatus also affords safety in preventing an uncontrolled roll of the apparatus as in the prior embodiments.

It is clear from the foregoing that a great variety of shapes may be employed in producing exercise apparatus in accordance with the invention. For example, FIGS. 9a, 9b, 9c and 9d show the outline of additional configurations available to achieve the advantages produced by the invention.

The location of the operating cavities can be shifted from one axis to another without substantially detracting from the results sought to be achieved with the invention. While the cavities are shown to be of a cylindrical shape, barrel, oval, spherical, and irregular shaped cavities are considered to be within the purview of the invention.

A variety of position orienting means may be employed in place of those shown but should be preferably fabricated from a resilient material which will not injure or cause bruising of an occupant of the apparatus of the invention which is being put to vigorous use. Further, reinforcing cylinders can be employed in conjunction with some, all or none of the embodiments of the invention.

I claim:

1. A recreational apparatus comprising a resilient body having an inner and outer surface and formed to have a major and minor axis, the inner surface of said body being formed as an elongated cavity along said major axis of said body for receiving and completely surrounding a human passenger, said cavity being of a length greater than the height of the human passenger being received, said cavity being equipped with position maintaining means to permit a passanger to assume a desired position in the cavity, passenger entry and exit means communicating with said cavity, said body being of a weight light enough to permit a passanger in said cavity to impart bounding and random motion to said body and to tip said body by shifting his weight, and said outer surface of said body including a circumferential protruding portion extending beyond the end of said minor axis of the body to provide a roll surface to said body while said body, when tipped, is also in pivotal contact with an external surface at one end, whereby a passenger can activate said apparatus as against an external surface to impart a bouncing and random motion to said apparatus and cause said body, when tipped, to roll and revolve about said minor axis like a top while pivoting on one end of said body.

2. The apparatus of claim 1 wherein the body has a generally irregular configuration.

3. A recreational apparatus as in claim 1 wherein the outer surface of said body is contoured to effect its path of travel to be generally in an arc of a circle.

4. A recreational apparatus as in claim 1 wherein said resilient body comprises at least one inflatable member.

5. A recreational apparatus as in claim 1 wherein said resilient body is formed from a plurality of inflatable members.

6. The apparatus of claim 1 including weighted means on the base portion of the body to return the body to its normal vertical at rest position when deflected therefrom.

References Cited

UNITED STATES PATENTS

| | | | |
|---|---|---|---|
| 2,838,022 | 6/1958 | Wilson. | |
| 763,518 | 6/1904 | Tann | 9—337 |
| 1,070,705 | 8/1913 | Lackner | 9—337 |
| 1,676,015 | 7/1928 | Feick | 272—1 |
| 2,800,666 | 7/1957 | Allenbach | 9—337 |
| 3,013,806 | 12/1961 | Boyd | 272—1 |
| 3,094,725 | 6/1963 | Martin | 9—336 |

OTHER REFERENCES

The Wide World Magazine, February 1929, pages 299–303.

ANTON O. OECHSLE, Primary Examiner

PAUL E. SHAPIRO, Assistant Examiner

U.S. Cl. X.R.

9—337; 272—1; 280—1, 206